(No Model.) 4 Sheets—Sheet 1.

J. A. PLOPPER.
NUT TAPPING MACHINE.

No. 498,186. Patented May 23, 1893.

Witnesses.
A. H. Opsahl.
E. F. Elmore

Inventor.
James A. Plopper
By his Attorney
Jas. F. Williamson (No Model.) 4 Sheets—Sheet 2.
J. A. PLOPPER.
NUT TAPPING MACHINE.
No. 498,186. Patented May 23, 1893.
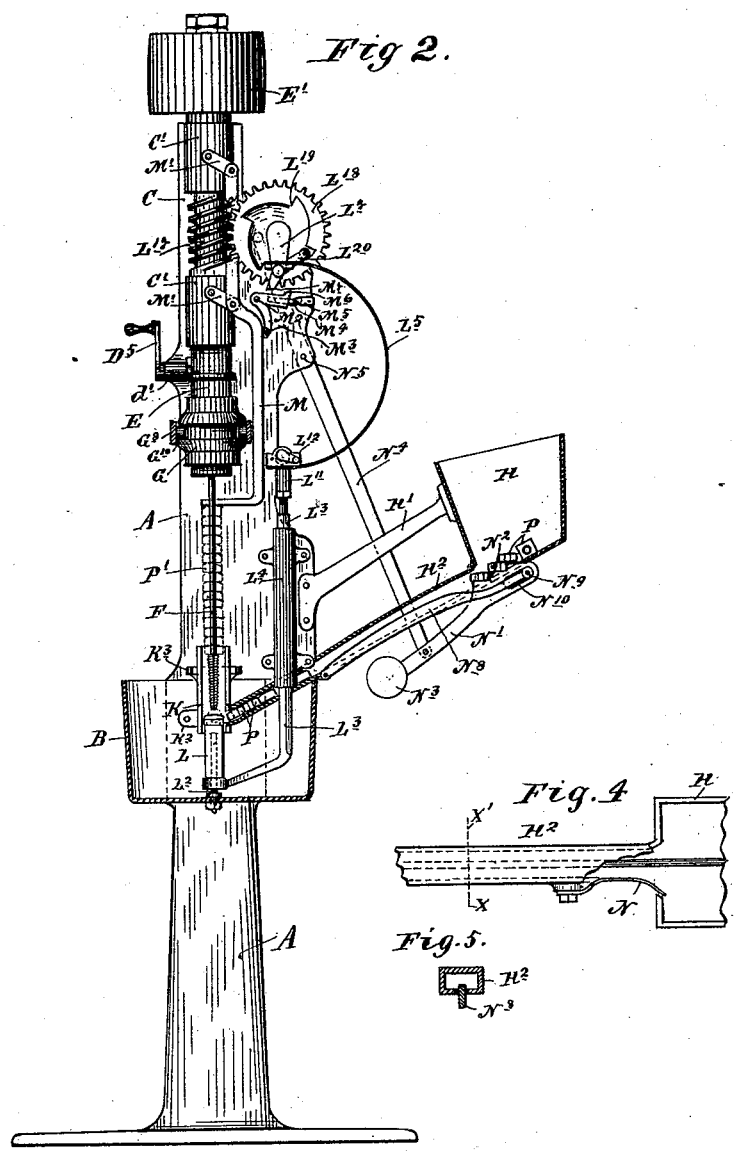
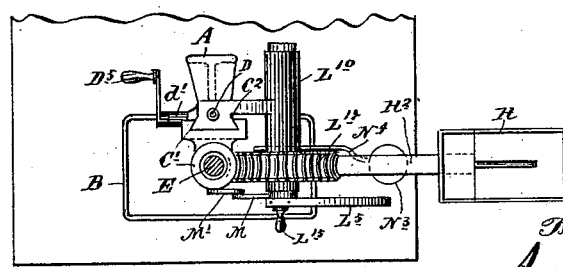
Witnesses
A. H. Opsahl.
E. F. Elmore.
Inventor
James A. Plopper,
By his Attorney.
Jas. F. Williamson.

(No Model.) 4 Sheets—Sheet 3.

J. A. PLOPPER.
NUT TAPPING MACHINE.

No. 498,186. Patented May 23, 1893.

Witnesses.
A. H. Opsahl.
E. F. Elmore.

Inventor.
James A. Plopper
By his Attorney.
Jas. F. Williamson

THE NORRIS PETERS CO., PHOTO-LITHO., WASHINGTON, D. C.

(No Model.) 4 Sheets—Sheet 4.
J. A. PLOPPER.
NUT TAPPING MACHINE.
No. 498,186. Patented May 23, 1893.
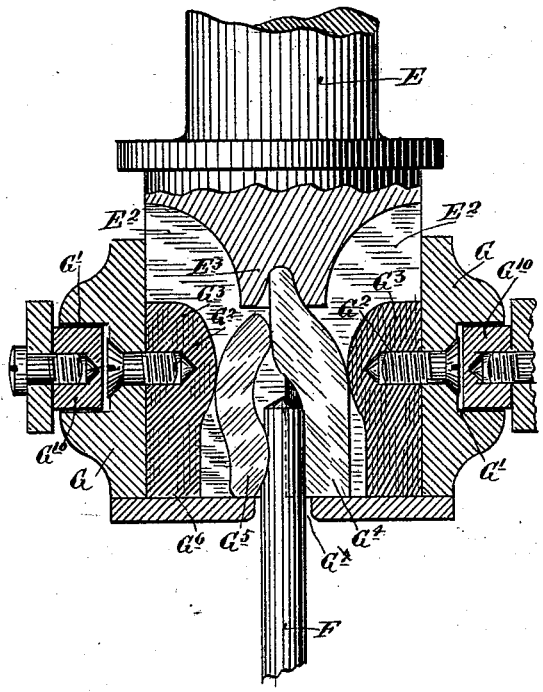
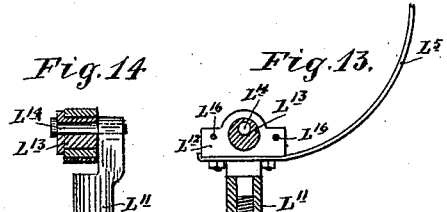
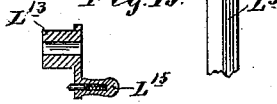
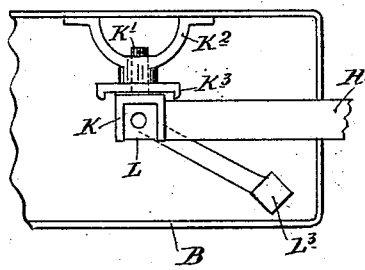
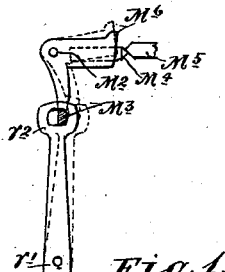
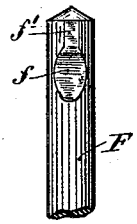
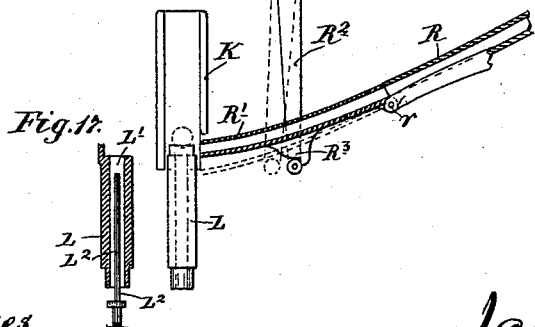
Witnesses
A. H. Opsahl.
E. F. Elmore
Inventor.
James A. Plopper
By his Attorney.
Jas. P. Williamson

UNITED STATES PATENT OFFICE.

JAMES A. PLOPPER, OF MINNEAPOLIS, MINNESOTA.

NUT-TAPPING MACHINE.

SPECIFICATION forming part of Letters Patent No. 498,186, dated May 23, 1893.

Application filed September 23, 1892. Serial No. 446,688. (No model.)

*To all whom it may concern:*

Be it known that I, JAMES A. PLOPPER, a citizen of the United States, residing at Minneapolis, in the county of Hennepin and State of Minnesota, have invented certain new and useful Improvements in Nut-Tapping Machines; and I do hereby declare the following to be a full, clear, and exact description of the invention, such as will enable others skilled in the art to which it appertains to make and use the same.

My invention relates to automatic nut tapping machines; and has for its object to provide a machine of simple construction and low first cost, which shall be efficient and durable in use.

To this end, the invention consists in certain novel devices and combinations of devices, which will hereinafter be fully described and be defined in the claims.

Figure 1:
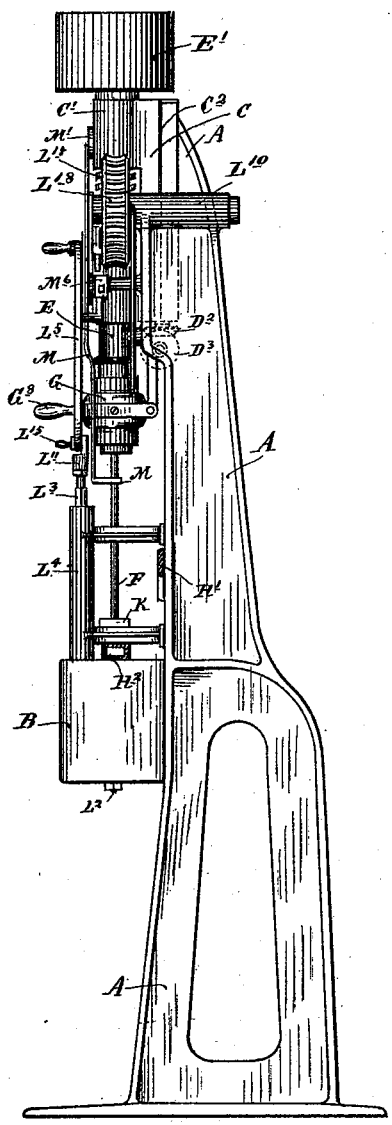
Figure 11:
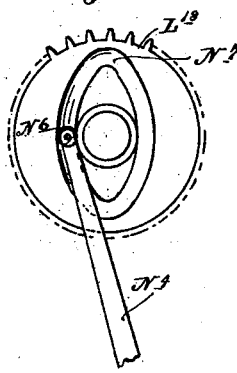
Figure 10:
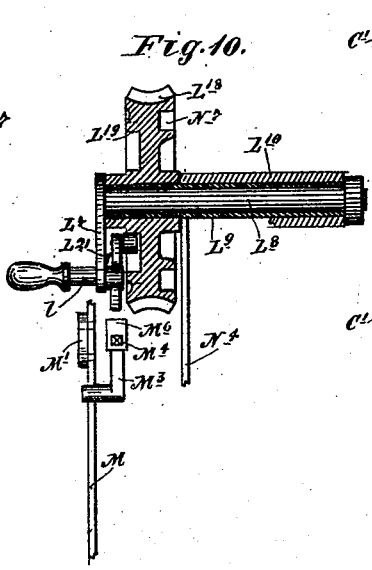
Figure 9:
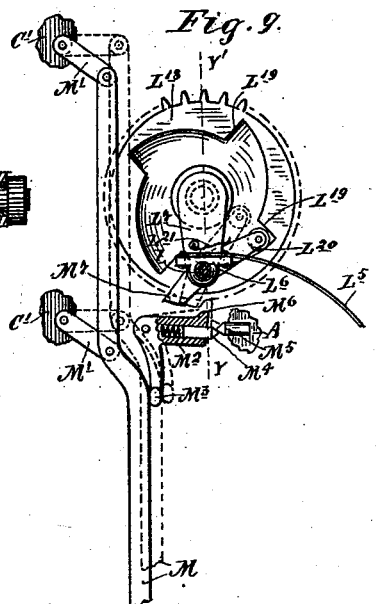
Figure 6:
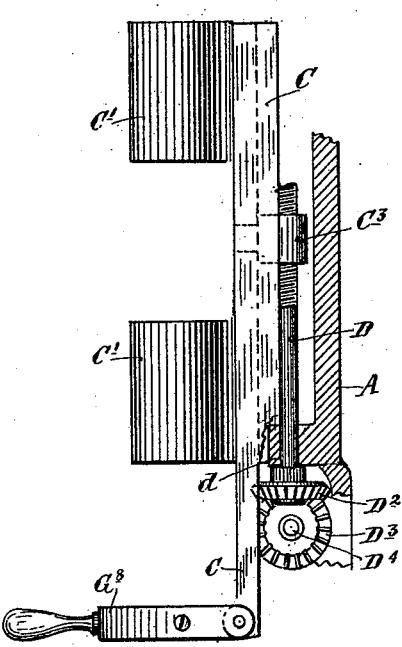
Figure 7:
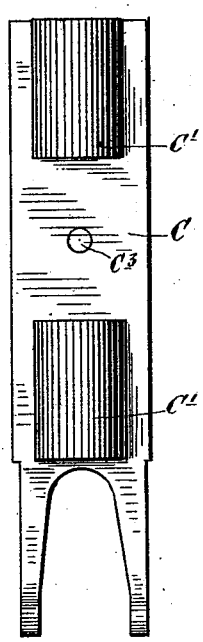
Figure 8:
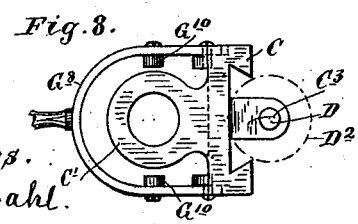

The accompanying drawings illustrate my improvements embodied in a working machine, wherein, like letters referring to like parts throughout, Figure 1 is a right side elevation of the machine, some parts of the same being shown in section and other parts being removed. Fig. 2 is a front elevation, some parts being shown in vertical transverse section from right to left. Fig. 3 is a plan view, some parts being shown in section, and others being broken away. Fig. 4 is a longitudinal transverse section of a portion of the blank supplying chute; and Fig. 5 is a section of the same on the line X X' of Fig. 4. Fig. 6 is a right side elevation, Fig. 7 a front elevation, and Fig. 8 a plan view, showing the vertically adjustable bearing block, which supports the tap carrying spindle, and some of its immediately connected parts. Fig. 9 is a detail in front elevation, some parts being shown in section, and others being broken away, showing parts of a trip mechanism for the nut blank feed devices. Fig. 10 is a vertical section from front to rear, taken approximately on the line Y Y' of Fig. 9, looking from the right toward the left of the machine. Fig. 11 is a rear elevation of a portion of the mechanism shown in Figs. 9 and 10. Fig. 12 is a detail partly in section, and partly in elevation, some parts being broken away, showing the construction of the tap chuck or stock with the tap stem in position. Figs. 13 and 14 are views in front and side elevation respectively, showing a detail in the construction of a portion of the nut blank feeding device; and Fig. 15 is a sectional view of a portion of the mechanism shown in Figs. 13 and 14. Fig. 16 is a detail, in plan, showing the way in which the threading or tapping box is mounted. Fig. 17 is a detail in section, showing feed plunger head. Fig. 18 is a detail showing the face of the tap stem. Fig. 19 is a view, partly in front elevation and partly in plan, showing a modification in the construction of the nut blank supplying chute.

A represents an upright casting, constituting the main frame to which the operative parts are secured.

B is an open box or basin fixed to the frame for catching the oil drippings from the tap.

C is a vertically adjustable bearing block provided with the tap spindle bearings C'. As shown, the sliding connection between the bearing block and the frame, is by a dove-tail joint $C^2$. The connection might, of course, be made in any other suitable way. The bearing block has projecting from its back a nut lug $C^3$, which is engaged by a vertical screw shaft D, held against endwise movement in bearing $d$, fixed to the frame, and carrying, at its lower end a bevel gear $D^2$. The bevel gear $D^2$ engages a bevel gear $D^3$ on a hand-shaft $D^4$ mounted in bearings $d'$ and provided at its left end with a crank handle $D^5$. The frame is constructed to give the necessary clearance for the vertical movement of the nut $C^3$. It is obvious that by this nut and screw and bevel gears, the bearing block C, may be given a vertical adjustment and will remain wherever set. Hence, by the movement of this bearing block and spindle, the tap may be adjusted into its proper working position in respect to the feed anvil, regardless of the length of the tap or the tap stem. This is an important improvement, enabling the use of short or long taps or tap stems; and permitting the continued use of any given tap as it is ground away.

E is the tap carrying spindle, mounted in the journal boxes C' of the bearing block C, fixed therein against endwise movement, and receiving its rotary motion from a belt (not shown) working over a pulley E' rigidly secured to the upper end of said spindle. On the lower end of this spindle is formed a chuck or tap stock, by means of which the tap F may be readily clamped therein and released therefrom, while the spindle is in motion. This chuck is constructed as follows:— The lower end of the spindle E is enlarged and cut away to form a transverse slot or seat $E^2$ having at its upper central portion, a fulcrum block $E^3$. Surrounding this seat $E^2$ and having a limited vertical movement, is a collar G provided on its periphery with an annular groove G'. Secured to the collar G by means of set screws $G^2$ is a pair of jam blocks $G^3$, mounted for vertical movement, in the opposite sides of the seat $E^2$. With this construction, it will be seen that the collar G will revolve with the spindle.

$G^4$ and $G^5$ are the clamping jaws, of which $G^4$ is fulcrumed at its upper end in the fulcrum block $E^3$ of the spindle, and clamps the shank of the tap F with its lower end; while the jaw $G^5$ is a loose piece adapted to engage the front or notched portion of the tap F, with its lower end. These jaws are held in place by a plate $G^6$ secured to the bottom of the spindle and provided with a central perforation $G^7$ for the admission of the tap. The notch in the tap is formed by cutting a cylindrical depression $f$ therein, transversely of its length. That portion $f'$ of the tap which extends from the notch to the upper extremity of the same is also slightly reduced to assist in placing the tap in position. The jaw $G^5$ is preferably made of spring metal, and in such form, that under the pressure from the jam blocks $G^3$, in clamping the tap, said jaw $G^5$ will spring slightly. Hence, as is obvious, the jaws will adapt themselves to taps, having shanks of considerable variation in size. The jaws are clamped upon the tap and released therefrom, by the camming action of the jam-blocks $G^3$ under their vertical movement with the collar G. This may be effected, while the spindle is in motion, by a two pronged hand-lever $G^8$ straddling the collar G, having the extremities of its prongs pivoted to the bearing block C, and provided with a pair of bosses or lugs $G^{10}$ working in the groove G', of said collar G. It is obvious, that by lowering or raising this hand-lever the collar and jam-blocks will be carried therewith, securing the tap to the clutch or releasing the same therefrom, at will.

H is a hopper or magazine for the nut blanks, supported by a bracket H', at the right of the machine. Extending from the lower left edge of this hopper, is a downwardly inclined supplying chute or spout $H^2$, the lower end of which opens into a threading or tapping box K, at a point immediately below the lower extremity of the tap. The nut-blanks are loosely and promiscuously deposited in the hopper H and are righted and entered into the supplying spout $H^2$, by means of automatic mechanism, which will be described later on.

The tapping box K is supported, within the catch basin B, on a pivot stud K' engaging a bracket $K^2$ secured within said basin. This bracket $K^2$ has lugs or prongs $K^3$ which embrace the sides of the tapping box K and permit the said tapping box a limited oscillatory motion to adapt itself to any irregularities in the running of the tap. (See Fig. 16.)

The tapping box K is formed open at its forward side. The inside of the box, in horizontal cross section, is formed so as to have a wrench action on the nut, to prevent the same from turning under the tapping action, while permitting the nut to be readily passed therethrough, under the tapping or threading action.

L is a vertically movable feed anvil, normally standing with its upper surface immediately below the tap, in position to receive the nut blank from the conveying spout $H^2$. This feed anvil L is provided with a vertical central perforation L' of sufficient diameter to permit the passage of the tap therethrough, when the said feed anvil is moved upward.

$L^2$ is a stud projecting upward from the bottom of the catch basin, working in the perforation L', and serving as a stop or rest for the tap, if dropped from the chuck. The bore of the anvil is larger than the stud, so as to give clearance for the passage of the chips from the tap. The feed anvil is moved upward to effect the engagement of the nut blank with the tap, through the following mechanism:

$L^3$ is a vertically movable plunger, working in a rectangular keeper $L^4$ supported from the frame-work A, and having its lower extremity bent toward the left and secured to the feed anvil L. The upper end of the plunger $L^3$ is secured to a bow-like spring-link or leaf $L^5$. The upper end of the link $L^5$ is fixed to a journal box $L^6$ carried on a pin $l$, of a crank $L^7$, fixed to the front end of an idle shaft $L^8$. The shaft $L^8$ is mounted in a sleeve or hollow shaft $L^9$, which in turn, is supported by a long bearing $L^{10}$ near the top of the frame A. It is evident, that when the crank $L^7$ and the shaft $L^8$ are revolved, the spring-link $L^5$, the plunger $L^3$ and the feed anvil L will be given a vertical reciprocation; and in virtue of said spring-link $L^5$, the nut will be fed onto the tap, on the upward movement of the anvil, with a yielding pressure.

The manner of connecting the upper end of the plunger $L^3$ to the lower end of the spring-link $L^5$ should be here noted. The upper end of said plunger $L^3$ is threaded and works in the depending end of a screw threaded block $L^{11}$; which block $L^{11}$ is secured to an eccentric strap or box $L^{12}$ rigid on the lower end of said spring-link $L^5$, by means of an eccentric $L^{13}$ and pin $L^{14}$. The eccentric $L^{13}$ has a hand operated, cam-acting spring latch $L^{15}$, the latch of which is engageable with either one of a pair of perforations $L^{16}$ in the block $L^{12}$. By means of the screw threaded engagement of the plunger $L^3$ with the block $L^{11}$, a considerable vertical adjustment of the said plunger and the feed anvil may be effected for properly setting the feed anvil; while, by the eccentric $L^{13}$ a slight adjustment may be instantaneously given to the anvil, without stopping the plunger, for cutting off the supply of nut blanks; if, for any reason, the same should be necessary.

Motion is automatically given to the shaft $L^8$ and the crank $L^7$, to effect the movements of the feed anvil L, as follows:—$L^{17}$ is a worm carried by the spindle E and engaging a worm-gear $L^{18}$, fixed to the sleeve $L^9$ within which works the idle shaft $L^8$. The front face of this worm wheel is cut away forming internal ratchet teeth $L^{19}$. The crank arm $L^7$ carries a spring-held pawl $L^{20}$, the free end of which normally tends, under the tension from its spring $L^{21}$, to engage with the ratchet teeth $L^{19}$; and, when so engaged, will revolve the shaft $L^8$ and crank $L^7$, thereby reciprocating or driving the plunger $L^3$ and the feed anvil L, by the movement of the tap spindle. The number of teeth in the worm gear $L^{18}$ should be such that it will receive one complete revolution, during the time required, to thread one nut. It should be here noted that the worm $L^{17}$ is of such a length that it will remain in engagement with the worm-gear $L^{18}$ throughout the vertical adjustments of the spindle bearing-block C. The nuts are, under the action just set forth, fed onto the tap by the feed anvil, one at a time, and collected on the stem or shank of the tap. When, however, the nuts have accumulated on the stem of the tap to within a safe limit of the chuck, a trip mechanism is actuated by the said accumulation of the nuts, to throw the feed mechanism out of action. This trip mechanism is as follows:—

M is a vertical trip-bar, the lower end of which is bent at an angle and stands near the tap stem in the path of the accumulating nuts; and the upper end of which is secured by means of a pair of links M' to the journal boxes C' of the bearing block C. These links M' hold the trip-bar M in a vertical position, while permitting the same to be moved upward and outward toward the right, under the tripping action.

$M^2$ is a bell-crank trip-stop pivoted to the frame work A, having on its lower arm a projecting lug $M^3$, which is normally held against the trip-bar M. The upper arm of the bell-crank $M^2$ carries a cam acting spring-latch $M^4$, which is engageable with a cam lug $M^5$ rigid on the said frame A. This cam lug $M^5$ and the latch $M^4$, co-operating together, tend to hold the bell crank in either its normal or its tripping position, but the said bell crank may be moved from one position to the other, past the cam lug $M^5$ by overcoming the spring tension of the said latch $M^4$. The latch end of this bell crank $M^4$ also carries a stop surface $M^6$, adapted to be thrown, by the movement of the said bell crank, into the path of a trip-arm $M^7$ projecting from the pawl $L^{20}$, and to thereby throw the free end of said pawl $L^{20}$ out of engagement with the ratchet teeth $L^{19}$ of the worm gear $L^{18}$.

It is evident that, when the trip-bar M is raised by the accumulation of nuts on the tap stem, as described, the outward movement of the same, toward the right, will rock said bell crank $M^2$, upward past the cam lug $M^5$ at its latch end, thereby throwing the stop surface $M^6$ into the path of the trip arm $M^7$ and causing the disengagement of the pawl $L^{20}$ as just described. This of course stops the movement of the crank $L^7$, the shaft $L^8$ and the feed anvil L, thus rendering the feeding device inoperative. The tap may be then removed and unloaded without stopping the spindle.

It should be noted that, when the feed mechanism is stopped, the feed anvil stands in its lowermost position. To again start the feed mechanism, it is only necessary to rock the bell-crank $M^2$ downward by hand into its normal position, where it will be held by its spring latch. The driving pawl $L^{20}$ will assume its active or driving position, under its tension from its spring $L^{21}$. After the tap is unloaded, the trip-bar will fall by gravity into its normal position. The trip-stop $M^2$, may, of course, be operated by hand, to stop the nut blank feed, whenever so desired.

It is obvious, that the pawl and ratchet for connecting or disconnecting the plunger driving shaft $L^8$ with the constantly running worm gear $L^{18}$, is in reality, a species of clutch in a constantly running drive mechanism, for rendering the constantly running members of the same inoperative on the nut blank feed.

The blank supplying mechanism will now be described. The receiving end of the supplying chute $H^2$ is made bell-mouthed and one side of the same is formed with a spring leaf or righting blade N. The action of this righting blade N will be as follows:—As the nut is forced into the bell mouthed entrance to the chute $H^2$, it will ordinarily engage the same on a diagonal, or with the corners of the nut. In this case, the spring righting blade, will yield and prevent the nut from being bound in the bell-mouth of the chute, and will, as the nut is farther advanced into the chute, serve by its spring tension, to right or turn the nut into a rectangular position with the chute.

N' is a rake-bar having at its upper end rake-teeth $N^2$ projecting, normally, into the hopper H, through a slot cut in the bottom of the same, and in the spout $H^2$, in which position it is normally held by a weight $N^3$ on the lower end of the rake-bar. This rake-bar N' is carried by, and fulcrumed to, the lower end of an oscillating lever $N^4$, pivoted at $N^5$ to the frame A. The upper end of this bar $N^4$ is provided with an antifriction roller $N^6$ working in a profile cam groove $N^7$, cut in the rear face of the worm gear $L^{18}$. This cam groove $N^7$ is so constructed as to give to the said lever $N^4$ and rake-bar $N'$ two reciprocations, at each revolution of the said worm wheel, or during the time required to tap one nut. The purpose of this action will presently appear. As the worm gear $L^{18}$ runs constantly, the lever $N^4$ and the rake-bar $N'$ will be kept in constant motion. The rake-bar is, however, rendered inactive, whenever necessary, by a shifting blade $N^8$. This blade is pivoted, at its lower end, to the floor of the chute $H^2$, and works in a longitudinal slot of the same, with the central part of its upper surface normally in the path of the nut blanks, but leaving sufficient clearance for the free passage of the blanks through the chute. The upper end of the shifting blade has a stud $N^9$ which works in a longitudinal slot $N^{10}$, in the upper end of the rake-bar $N'$, which slot is of sufficient length to permit the stroke of the rake-bar.

Whenever the nut blanks accumulate in the chute $H^2$, to such an extent as to back up over the top of the shifting blade $N^8$, they will force the blade downward by their weight and throw the rake-head downward, so that it will reciprocate below the bottom of the blank hopper H and be inoperative to force outward any blanks.

The purpose of the double stroke on the rake head for every turn of the worm-gear $L^{18}$ and every feed movement of the anvil L, is to insure a sufficient supply of blanks. Otherwise, the supply might be short, by the failure of the rake to engage with the blanks in the hopper on some of its strokes. The purpose of shifting the rake head into an inoperative position, is to prevent an over supply of blanks and prevent the breakage which might otherwise occur on the accumulation of the nuts.

It is of course, obvious, that the size of the threading box and the relation of the same to the feed anvil and the supply chute are such as to admit only one nut blank at a time.

P represents the nut blanks and P' the finished nuts (in dotted lines).

Operation: The operation of the machine as an entirety is obvious from the detailed description; but may be summarized as follows:—The tap spindle is kept in constant motion. The nut blanks are supplied from the hopper, by the rake-bar, to the supply chute and forced down the same to the threading box. The nuts will be admitted to the threading box over the feed anvil and under the tap, one at a time, at the limit of the down stroke of the anvil; and, on the up stroke of the anvil, the nut then in the box will be fed upward to the tap, under yielding pressure, this pressure continuing long enough to insure the engagement of the blank with the tap. The finished nut will be forced upward onto the tap stem. These actions will continue until enough nuts accumulate on the tap stem for the top member, to strike and raise the trip-bar, thereby actuating the trip and stopping the reciprocation of the feed anvil. The clutch lever will then be raised, by the operator, releasing the tap; and the tap will be unloaded, returned to position and fastened by lowering the clutch lever, without stopping the spindle. The operator then throws the trip stop $M^2$ back down into its normal position, again starting the feed anvil into action. The rake-bar, for supplying the blanks from the hopper, runs constantly, but is rendered inoperative, whenever necessary, by the accumulation of the blanks in the supply chute, as hitherto fully described.

Referring now to the modification shown in Fig. 19, the blank supplying chute is constructed in two sections R R', of which the upper section R is fixed to the blank hopper and the lower section is pivotally connected to the upper section, as shown at $r$. The lower or free end of the pivoted section R' is carried by the lower arm of a hanger $R^2$ pivoted to the frame A, as shown, at $r'$. The upper arm of this hanger has a slotted head $r^2$ engaging over the lug $M^3$ on the lower arm of the bell-crank-feed-trip-stop $M^2$. When the said trip-stop $M^2$ is in its normal position, the lower arm of the hanger $R^2$ will engage under the enlarged part of a cam-block or rest $R^3$, fixed to the under surface of the chute section R', and hold the lower end of the same up in a delivering position, as shown in full lines in Fig. 19. When the nuts accumulate on the tap stem and the trip stop $M^2$ is thrown up, to stop the movement of the feed anvil, the lower arm of the hanger $R^2$ will be thrown to the left off from the cam block $R^3$, permitting the lower end of the chute section to lower into its dotted line position, as shown in Fig. 19, so as to abut against the side of the feed anvil and prevent any blank from entering the threading box. The other parts are constructed and operate, as in the main views. The advantage of this modification is that the supply is necessarily cut off with the stopping of the feed anvil; thereby precluding all possibility of any blanks being forced up through the threading box, when the tap is out for unloading.

The machine may be used for tapping nuts of considerable variation in size, by the use of interchangeable supply chutes, threading boxes and clamping jaws.

The general advantages of my improved machine are relatively low cost, in virtue of simple construction, and equal capacity, in virtue of its constantly running parts and general design, as compared with the power machines now in use. The machine requires so little attention, that one operator can attend to several machines.

What I claim, and desire to secure by Letters Patent of the United States, is as follows:

1. In a nut tapping machine, the combination of a tap and tap spindle, of automatic nut blank feeding mechanism, and a trip device, for said feeding mechanism, arranged to be tripped by the accumulation of nuts on the tap stem, whereby the feed will be stopped, whenever it is necessary to unload the tap, substantially as described.

2. In a nut tapping machine, the combination with a constantly running tap-spindle, of a reciprocating nut blank feeding device for feeding the nuts toward the spindle and a drive for reciprocating said feeding device at each feed movement, operated from said spindle and provided with means for throwing the same into and out of operative engagement therewith, substantially as described.

3. In a nut tapping machine, the combination with a constantly running tap spindle, of a nut blank feeding device, and a drive for said feeding device, driven from the said spindle and having as one of its elements a clutch mechanism for throwing the same into and out of gear with the said spindle, substantially as described.

4. In a nut tapping machine, substantially as described, the combination with the constantly running tap spindle, the threading box, the feed anvil and the plunger attached to said anvil, of a drive for operating said plunger and feed anvil from said spindle, comprising a worm on the spindle, a worm gear, engaged thereby and kept in constant motion, provided with internal ratchet teeth on one of its faces, an idle shaft loosely mounted concentric with the hub of the worm-gear and provided with a crank connected to the feed anvil plunger and carrying a spring-held driving pawl normally tending to engage with said ratchet teeth, substantially as described.

5. The combination with the constantly running tap spindle, threading box and feed anvil plunger, of the drive for the plunger, consisting of the worm on the spindle, the worm gear driven thereby having internal ratchet teeth, the idle shaft with spring-held driving pawl normally engaging said ratchet teeth, and a trip mechanism, for throwing said pawl out of engagement with said teeth, arranged to be operated by the accumulation of the nuts on the tap stem.

6. In the drive, substantially as described, for operating the feed anvil from the constantly running tap spindle, the combination with the worm gear having internal ratchet teeth, of the idle shaft provided with a crank connected to the anvil plunger and a spring-held driving pawl normally engaging said ratchet teeth, of the bell-crank trip-stop for action on said pawl, provided with a latching device, for holding the same in its normal or in its tripping position, and the trip-bar carried by the spindle bearing block and mounted for vertical and lateral motion thereon, into the path of the trip lever, when engaged by the accumulated nuts on the tap-stem, for automatically releasing said driving pawl from the ratchet teeth in the worm gear and stopping the feed anvil, substantially as described.

7. The combination with the tap and tap spindle, the threading box and supply chute, of the feed-anvil and the reciprocating plunger carrying the same, having two of its sections connected by an eccentric and strap, the eccentric member of which is provided with a finger piece, whereby the anvil may be given an instantaneous adjustment to cut off the supply of blanks, without stopping the plunger, substantially as described.

8. In a nut tapping machine, the combination with the threading box, blank hopper and supply chute from the same, of the reciprocating rake-bar, in constant motion, for forcing the blanks from the hopper and through the chute to the threading box, and a shifting blade, lying in the path of the blanks accumulating in the chute and connected to the head of the rake, whereby the weight of the accumulated nuts will throw the rake head into an inoperative position.

9. The combination with the blank hopper H and the supply chute $H^2$, of the rake bar $N'$, pivoted to the driving lever $N^4$, and provided with the weight $N^3$, and the pivoted shifting blade $N^8$, seated in a slot of the chute and having a slot and pin engagement with the head of the rake, substantially as and for the purpose set forth.

10. The combination with the tap and tap spindle, and a reciprocating feed anvil, for feeding the blanks to the tap of a pivoted threading box and lateral stops for the same, whereby the said box will adapt itself to any irregularities in the run of the tap or the movement of the feed anvil, substantially as described.

11. In combination with nut tapping mechanism, a feed anvil plunger having one section constructed in the form of a leaf spring, serving the double function of connecting link and spring device, adapting the same to feed the blank to the tap under yielding pressure.

12. In a nut tapping machine, the combination with the supporting frame, of the adjustable bearing block mounted on said frame, the tap carrying spindle mounted on said bearing block, for vertical adjustment therewith, the reciprocating nut blank feed device, and a drive for said feed device comprising as constituent parts thereof, a worm-gear mounted on said supporting frame, and a worm carried by the spindle and engaging said worm-gear; said worm being of such length as to remain in engagement with the said worm-gear throughout the adjustment of the spindle carrying block, substantially as and for the purpose set forth.

13. The combination with the blank hopper, of the supply chute, rectangular in cross section and having a bell mouth at its junction with the hopper, for entering the nuts, of the yielding spring blade N forming one side wall of the bell mouthed portion of the chute, for righting the nuts and insuring their entrance to the chute, substantially as described.

14. The combination with the hollow feed anvil $L\ L'$, of the stop-rod $L^2$, projecting into the perforation of said hollow anvil, said stop-rod being of less diameter than the perforation in the said anvil, and serving to prevent the entrance of the tap into said perforation, beyond a fixed limit, while permitting the chip from the tapped nuts to drop therethrough, substantially as described.

15. In a nut tapping machine, the combination with the tap spindle provided at its lower end with the transverse seat $E^2$, having at its upper central portion, the fulcrum block $E^3$, of the collar G, surrounding the seat $E^2$ and having a limited vertical movement, the jam-blocks $G^3$ carried by the collar G and working in said seat $E^2$, the clamping jaws $G^4$ $G^5$ in the seat $E^2$, and means for giving a vertical movement to the said collar G, substantially as described.

16. In a nut tapping machine, the combination with the tap spindle provided at its lower end with the seat $E^2$ and the fulcrum-block $E^3$, of the vertically movable collar G provided with the peripheral annular groove $G'$, the jam-blocks $G^3$ carried by said collar, the spring clamping jaw $G^4$ and the rigid jaw $G^5$ in the seat $E^2$, and the hand-lever $G^8$ having the projections $G^{10}$ working in the peripheral groove $G'$ of the collar G, substantially as and for the purpose set forth.

In testimony whereof I affix my signature in presence of two witnesses.

JAMES A. PLOPPER.

Witnesses:
JAS. F. WILLIAMSON,
EMMA F. ELMORE.